Patented July 29, 1930

1,771,396

UNITED STATES PATENT OFFICE

SAMUEL CAPLAN, OF BROOKLYN, NEW YORK

COMPOSITION FOR PURIFYING EXHAUST GASES

No Drawing. Application filed October 1, 1927. Serial No. 223,311.

The present invention relates to internal combustion engines and has for its principal object the conversion of substantially all or a considerable proportion of the poisonous carbon-monoxide in the exhaust gases therefrom to carbon dioxide. More specifically, the invention contemplates the purification of the exhaust gases by passing them through suitable absorbing or adsorbing and chemical and/or catalytic agents, whereby the poisonous carbon-monoxide is converted, all of which may be contained in a casing or shell adapted to be readily installed in existing exhaust lines.

A suitable shell or holder through which the engine exhaust gases must pass is substantially filled with a gas absorbing agent in granular form, preferably a mixture of approximately 15% charcoal and 85% Newchar, the latter being a relatively pure vegetable carbon particularly effective for this specific purpose. This gas absorbing material, which I will hereinafter designate as charcoal, without however limiting myself to any specific form thereof, provides not only a porous path for the exhaust gases offering but slight resistance to their flow, but also serves as a carrying and distributing medium for the oxidizing and catalytic agents employed.

For purposes of converting the carbon-monoxide I have found that a very effective combination of oxidizing agents and catalysts includes a mixture of substantially equal weights of cobalt, silver nitrate and nickel, to which is added a relatively small amount of iodic acid. For example, about two ounces each of nickel, silver nitrate and cobalt, with 25 grains of iodic acid will serve to consistently reduce to about 2% the CO content of the exhaust gases from an average automobile engine normally emitting gases containing 8% or more of CO. Proportions and quantities are, of course, subject to variation.

Under certain conditions it may be desirable to employ purifying agents in addition to those above noted, and on the other hand I do not necessarily limit myself to the use of all the specific materials in conjunction with each other. The cobalt and nickel appear to act as catalysts, and it is not essential that both of them be employed. The presence of nickel, or nickel oxide, in the mixture is very important. The combination of a catalyst such as nickel or nickel oxide, silver nitrate and an iodine ingredient or ingredients, in association with an absorbent or adsorbent agent, in a chamber connected or connectible in the engine exhaust gas passage, constitute means which I have found to be effective for greatly reducing or eliminating the carbon monoxide content of automobile exhaust.

Iodine, hereinafter mentioned, may be used in place of iodic acid, and is even more lasting. There is advantage, however, in using both iodine and iodic acid in the mixture.

The oxidizing and catalyzing agents, in flake or granular form are thoroughly distributed throughout the charcoal mass, presenting a large area of contact to the gases, while the whole permits free flow of the gases through the purifier and converter, avoiding back pressure. In this connection it is to be noted that while heat, as well as moisture, aids in the reactions incident to the conversion of the CO content of the gases, extreme temperatures are not necessary with the agents I employ, and I am therefore enabled to place the purifying unit in the exhaust line behind the muffler.

In order to further purify the exhaust gases and render them free from objectionable odors, I may further employ such materials as iodine, acetate or carbonate of ammonia, and chloride of lime.

I have found that with the materials mentioned, the gas absorption is sufficient to substantially eliminate the emission of CO content of the gases for short periods of time, such for example as that required to start and warm up the engine and take an automobile from a garage, and thereafter the CO content is held to a very low figure by the chemical and catalytic action for comparatively long periods of time. A certain reactivating or recuperation of the materials appears to take place under different conditions of engine operation and in the alternation between periods of operation and rest that renders renewal thereof necessary only at long intervals, if at all during the ordinary life of a car, and it will be apparent from the foregoing description that I have provided means whereby a purifying unit may not only be readily installed but may as readily be renewed, preferably by the substitution of a new unit.

I claim:

1. A composition of matter for purifying the exhaust gases of internal combustion engines, comprising silver nitrate, a catalyst, and a small amount of an iodine ingredient, in association with absorbent material.

2. A composition of matter for purifying the exhaust gases of internal combustion engines, comprising silver nitrate, a catalyst, and small amounts of iodine and iodic acid, in association with absorbent material.

3. A composition of matter for purifying the exhaust gases of internal combustion engines, comprising silver nitrate, nickel, and a small amount of an iodine ingredient or ingredients, in association with absorbent material.

4. A composition of matter for purifying the exhaust gases of internal combustion engines, comprising silver nitrate, nickel, and small amounts of iodine and iodic acid, in association with absorbent material.

SAMUEL CAPLAN.